United States Patent
Nakagawa

[11] 3,743,387
[45] July 3, 1973

[54] LARGE APERTURE SIX COMPONENT PHOTOGRAPHIC LENS
[75] Inventor: Jihei Nakagawa, Tokyo, Japan
[73] Assignee: Olympus Optical Co., Ltd., Tokyo, Japan
[22] Filed: Nov. 5, 1971
[21] Appl. No.: 196,081

[52] U.S. Cl. .................................. 350/215, 350/176
[51] Int. Cl. ............................................. G02b 9/62
[58] Field of Search ..................................... 350/215

[56] References Cited
FOREIGN PATENTS OR APPLICATIONS
1,120,335   7/1968   Great Britain..................... 350/215

*Primary Examiner*—John K. Corbin
*Attorney*—Kurt Kelman

[57] ABSTRACT

Large aperture photographic lens of the modified Gauss type consisting of seven lens elements which form six lens groups. The fourth lens group from the object side consists of two lens elements cemented to each other forming a concave meniscus as a whole with the concave side directed to the object, and the absolute value of the radius of curvature of the cemented surfaces is smaller than the value three times the focal length of the photographic lens while the cemented surfaces are concave toward the object, so that the thickness of the fourth lens group is made small thereby permitting the total length of the photographic lens to be made small to increase the light quantity in the marginal zone.

1 Claim, 4 Drawing Figures

SPHERICAL ABERRATION

ASTIGMATISM

DISTORTION

LARGE APERTURE SIX COMPONENT PHOTOGRAPHIC LENS

BACKGROUND OF THE INVENTION

The present invention relates to a large aperture photographic lens of the modified Gauss type consisting of seven lens elements which form six lens groups, and more particularly, to a large aperture photographic lens of the type described above having a relative aperture of 1:1.2, an angle of field of 43° and a sufficiently large distance between the back lens thereof and the image formed by the photographic lens (to be referred to as a back focus hereinbelow) suitable for use in a single lens reflex camera while various aberrations are sufficiently eliminated from the photographic lens.

A large aperture photographic lens having a great back focus has been desired for use in a single lens reflex camera.

The present invention aims at providing a high quality large aperture photographic lens of the type described above.

SUMMARY OF THE INVENTION

The object of the present invention is to provide a novel and useful large aperture photographic lens of the modified Gauss type which has a large relative aperture of 1:1.2, a wide angle of field of 43° and a sufficiently large back focus suitable for use in a single lens reflex camera while various aberrations are sufficiently eliminated from the objective lens.

The photographic lens of the present invention consists of seven lens elements forming six lens groups, of which the first and the second lens groups beginning at the object side are each made of a convex meniscus with its convex side directed to the object side, the third lens group being a concave meniscus with its convex side directed to the object side, the fourth lens group consisting of two lens elements cemented to each other to form a concave meniscus as a whole with the concave side thereof directed to the object side, the fifth lens group being a convex meniscus with its concave side directed to the object side, while the sixth lens group is a convexo-convex lens element, the photographic lens being characterized in that the absolute value of the radius of curvature of the cemented surfaces of the fourth lens group is selected to be smaller than the value three times the focal length of the photographic lens while the above described radius of curvature is selected to be minus, i.e., the cemented surfaces are made remarkably concave to the object side in comparison with the usual photographic lens of the Gauss type, thus making it possible to reduce the thickness of the fourth lens group consisting of two lens elements cemented to each other, so that the total length of the photographic lens is made small while the light quantity in the marginal zone is made remarkably great. By the construction of the photographic lens in accordance with the present invention, the aberration of the sagital light bundle in the marginal zone in the angle of field can be appropriately compensated for. However, if the absolute value of the above described radius of curvature of the cemented surfaces in the fourth lens group is made too small, difficulties will arise in the compensation for the chromatic aberration and the upper light ray in the oblique light bundle in the intermediate angle of the angle of field. The present invention provides a high quality photographic lens by utilizing the above described properties and appropriately selecting the values of the various factors of the lens elements.

BRIEF DESCRIPTION OF THE DRAWING

FIGS. 2 to 4 are diagrams showing various aberration curves of the photographic lens of FIG. 1, FIG. 2 showing the spherical aberration curve, FIG. 3 showing the astigmatism, while FIG. 4 shows the distortion.

DETAILED DESCRIPTION OF THE PREFERRED EMBODIMENT

Figure 1:
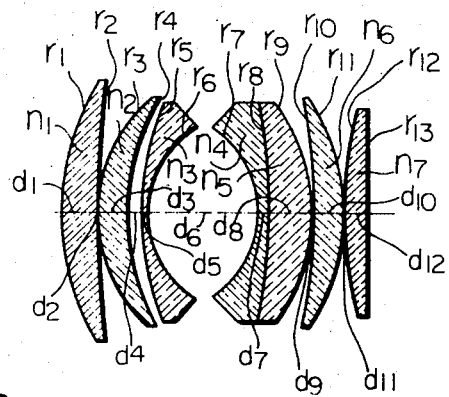
FIG. 1 is a longitudinal sectional view showing the construction of the large aperture photographic lens constructed in accordance with the present invention.

Referring to FIG. 1, the photographic lens of the present invention comprises seven lens elements constituting six lens groups, of which the first and the second lens groups beginning at the object side, i.e. at the left side of the figure are each made of a convex meniscus having the convex side thereof directed to the object, the third lens group being a concave meniscus having its convex side directed to the object, the fourth lens groups consisting of two lens elements cemented to each other to form a concave meniscus as a whole having the concave side thereof directed to the object, the fifth lens group being a convex meniscus having its concave side directed to the object, while the sixth lens group is a convexo-convex lens element.

Assuming that the radius of curvature of each of the refracting surfaces of the lens elements are $r_1, r_2 - r_{13}$ beginning at the object side, and the thickness of each of the lens elements and the air gap between the adjacent lens elements beginning at the object side are $d_1, d_2 - d_{12}$, the refractive index of each of the lens elements being $n_1, n_2 - n_7$ beginning at the object side, while the Abbe number of each of the lens elements is $\nu_1, \nu_2 - \nu_7$ beginning at the object side, the photographic lens satisfies the following conditions:

$r_1 = 0.7165$
$r_2 = 2.5138$
$r_3 = 0.4702$
$r_4 = 0.7194$
$r_5 = 0.8663$
$r_6 = 0.2957$
$r_7 = -0.3267$
$r_8 = -1.7781$
$r_9 = -0.5193$
$r_{10} = -1.8394$
$r_{11} = -0.5741$
$r_{12} = 1.4655$
$r_{13} = -16.6768$
$d_1 = 0.1103$
$d_2 = 0.0021$
$d_3 = 0.0890$
$d_4 = 0.0347$
$d_5 = 0.0320$
$d_6 = 0.3413$
$d_7 = 0.0320$
$d_8 = 0.1388$
$d_9 = 0.0018$
$d_{10} = 0.1014$
$d_{11} = 0.0021$
$d_{12} = 0.0623$
$n_1 = 1.8030$
$n_2 = 1.8061$ $n_3 = 1.7618$
$n_4 = 1.7283$
$n_5 = 1.7550$
$n_6 = 1.7130$
$n_7 = 1.7130$
$\nu_1 = 46.6$
$\nu_2 = 40.8$
$\nu_3 = 27.1$
$\nu_4 = 28.5$
$\nu_5 = 52.4$
$\nu_6 = 53.9$
$\nu_7 = 53.9$.

The focal length $f$ of the photographic lens is 1, and the back focus $f_B$ is 0.6899, while the relative aperture F is 1:1.2, the angle of field $2w$ being 43°.

As described previously, the photographic lens satisfies the requirements:

$$r_8 < 3f$$
$$r_8 < 0$$

Thus, the highly concave cemented surfaces of the fourth lens group are directed toward the object in comparison with the usual Gauss type photographic lens, thereby permitting the thickness of the fourth lens group to be remarkably reduced so that the light quantity in the marginal zone is made very great while the total length of the photographic lens is made small.

Figure 2:
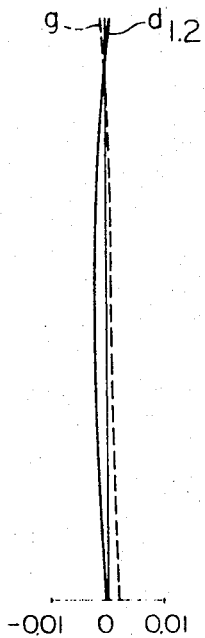
Figure 3:
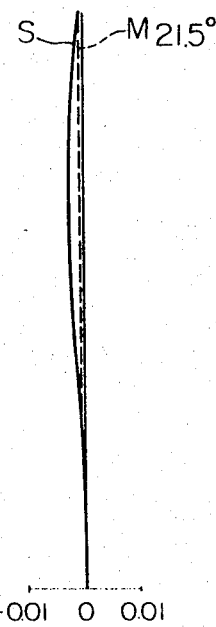
Figure 4:
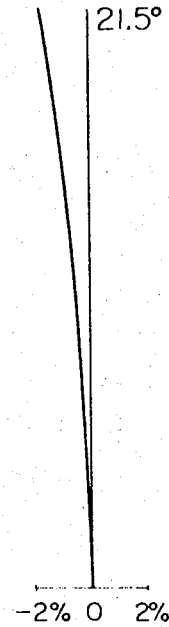

Various aberration curves of the photographic lens is described above are shown in FIGS. 2 to 4, FIG. 2 showing the spherical aberration, FIG. 3 showing the astigmatism while FIG. 4 shows the distortion.

As is clear from these diagrams, the spherical aberration, the distortion as well as the astigmatism etc. are remarkably compensated for to provide a high quality large aperture photographic lens.

I claim:

1. In a large aperture photographic lens consisting of seven lens elements which form six lens groups, the improvement wherein the first and the second lens groups beginning at the object side are each made of a convex meniscus with the convex side thereof being directed to the object side, and the third lens group is a concave meniscus with its convex side being directed to the object side, the fourth lens group being made of two lens elements cemented to each other forming a concave meniscus as a whole with the concave side thereof being directed to the object side, the fifth lens group being a convex meniscus with its concave side being directed to the object side, while the sixth lens group being a convexo-convex lens element, said lens elements satisfying the following numerical data:

$r_1 = 0.7165$
$r_2 = 2.5138$
$r_3 = 0.4702$
$r_4 = 0.7194$
$r_5 = 0.8663$
$r_6 = 0.2957$
$r_7 = -0.3267$
$r_8 = -1.7781$
$r_9 = -0.5193$
$r_{10} = -1.8394$
$r_{11} = -0.5741$
$r_{12} = 1.4655$
$r_{13} = -16.6768$
$d_1 = 0.1103$
$d_2 = 0.0021$
$d_3 = 0.0890$
$d_4 = 0.0347$
$d_5 = 0.0320$
$d_6 = 0.3413$
$d_7 = 0.0320$
$d_8 = 0.1388$
$d_9 = 0.0018$
$d_{10} = 0.1014$
$d_{11} = 0.0021$
$d_{12} = 0.0633$
$n_1 = 1.8030$
$n_2 = 1.8061$
$n_3 = 1.7618$
$n_4 = 1.7283$
$n_5 = 1.7550$
$n_6 = 1.7130$
$n_7 = 1.7130$
$\nu_1 = 46.6$
$\nu_2 = 40.8$
$\nu_3 = 27.1$
$\nu_4 = 28.5$
$\nu_5 = 52.4$
$\nu_6 = 53.9$
$\nu_7 = 53.9$ where:

$r_i$ ($i = 1 - 13$) = the radius of curvature of each of the refracting surfaces of the lens elements, $i$ beginning at the object side $d_i$ ($i = 1 - 12$) = the thickness of each of the lens elements and the air gap between the adjacent lens elements, $i$ beginning at the object side $n_i$ ($i = 1 - 7$) = the refractive index of each of the lens elements, $i$ beginning at the object side $\nu_i$ ($i = 1 - 7$) = the Abbe number of each of the lens elements, $i$ beginning at the object side.

* * * * *